(12) United States Patent
Okerlund

(10) Patent No.: US 10,654,327 B2
(45) Date of Patent: *May 19, 2020

(54) RECEIVER PIN LOCKING DEVICE

(71) Applicant: HORIZON GLOBAL AMERICAS INC., Plymouth, MI (US)

(72) Inventor: Kawa-She-Quoen Okerlund, Wittenberg, WI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 211 days.

This patent is subject to a terminal disclaimer.

(21) Appl. No.: 15/482,859

(22) Filed: Apr. 10, 2017

(65) Prior Publication Data
US 2017/0313144 A1    Nov. 2, 2017

Related U.S. Application Data

(63) Continuation of application No. 14/523,173, filed on Oct. 24, 2014, now Pat. No. 9,616,723.

(51) Int. Cl.
*B60D 1/52* (2006.01)
*B60D 1/60* (2006.01)

(52) U.S. Cl.
CPC .............. *B60D 1/60* (2013.01); *B60D 1/52* (2013.01)

(58) Field of Classification Search
CPC ..................................... B60D 1/52; B60D 1/60
USPC ......................................................... 280/507
See application file for complete search history.

(56) References Cited

U.S. PATENT DOCUMENTS

| 1,974,966 | A |   | 9/1934  | McClure |
|-----------|---|---|---------|---------|
| 2,161,390 | A | * | 6/1939  | Schmalstieg ............ B61G 7/00 213/188 |
| 2,898,797 | A |   | 8/1959  | Bronstein |
| 3,081,663 | A |   | 3/1963  | Davis |
| 3,335,631 | A |   | 8/1967  | Heeren |
| 3,415,580 | A |   | 12/1968 | Malmsten |
| 3,782,762 | A | * | 1/1974  | Nagy ..................... B60D 1/065 280/507 |
| 5,199,733 | A |   | 4/1993  | DeLorme |
| 5,517,734 | A |   | 5/1996  | Korpi |
| 5,615,904 | A | * | 4/1997  | Van Dusen ............. B60D 1/52 224/506 |
| 5,988,667 | A |   | 11/1999 | Young |
| 6,055,832 | A | * | 5/2000  | Wyers .................. E05B 17/183 70/18 |
| 6,193,261 | B1 |  | 2/2001  | Hahka |
| 6,409,203 | B1 |  | 6/2002  | Williams |
| 6,609,725 | B1 |  | 8/2003  | Williams |

(Continued)

*Primary Examiner* — Jacob D Knutson
(74) *Attorney, Agent, or Firm* — McDonald Hopkins LLC

(57) ABSTRACT

A receiver pin lock for insertion into first and second sized opposed engaging apertures of first and second hitch receivers is shown and described. The receiver pin lock may include a stem, a first stepped portion extend from the stem, and a lock member selectively engageable with the stem, the lock member preventing removal of stem from either of the first and second hitch receivers. The receiver pin lock may also include a second stepped portion positioned on the lock member and extending from the stem, where the stem is configured to operatively engage the first sized engaging apertures of the first hitch receiver and the first and second stepped portions are configured to operatively engage the second sized engaging apertures of the second hitch receiver.

12 Claims, 3 Drawing Sheets

(56) References Cited

U.S. PATENT DOCUMENTS

| | | | |
|---|---|---|---|
| 6,672,115 B2 * | 1/2004 | Wyers | B60D 1/52 |
| | | | 280/506 |
| 6,887,022 B2 | 5/2005 | Choate | |
| 7,116,556 B2 | 10/2006 | Lee | |
| 7,225,649 B2 * | 6/2007 | Wyers | B60D 1/60 |
| | | | 70/258 |
| 7,448,823 B2 | 11/2008 | Silva | |
| 7,891,903 B2 | 2/2011 | Klingenberg | |
| 8,079,613 B2 | 12/2011 | Williams | |
| 8,267,420 B2 | 9/2012 | Merten | |
| 8,328,223 B2 | 12/2012 | Leinenger | |
| 9,616,723 B2 * | 4/2017 | Okerlund | B60D 1/60 |
| 2002/0026693 A1 | 3/2002 | Akema | |
| 2005/0236811 A1 | 10/2005 | Williams | |
| 2008/0056814 A1 | 3/2008 | Klingenberg | |
| 2009/0096189 A1 | 4/2009 | Merten | |
| 2012/0091691 A1 | 4/2012 | Leinenger | |

* cited by examiner

RECEIVER PIN LOCKING DEVICE

CROSS-REFERENCE TO RELATED APPLICATION

This application is a continuation of U.S. application Ser. No. 14/523,173, entitled "Receiver Pin Locking Device," filed on Oct. 24, 2014, which is hereby incorporated in its entirety by reference.

TECHNICAL FIELD

The present invention relates generally to a pin locking device and, more particularly, to a pin locking device for locking different sized drawbars with receiver hitches.

BACKGROUND

Many vehicles are equipped with rear or front mounted receiver hitches used for towing of vehicles and as an attachment point for many other cargo accessories. These types of receiver hitches typically include a receiver opening or cavity used for the receipt of a drawbar. Receiver openings come in various sizes—the size may depend upon the towing capabilities thereof. For example, receiver-type trailer hitch assemblies are offered with a generally square receiver opening of 1¼ inches (32 mm) for Class I/II and 2 inches (51 mm) for Class II/IV/V.

A drawbar having a shank includes outer dimensions slightly smaller than the internal dimensions of the receiver opening and is slidable within the receiver opening. The drawbar is typically connected to the receiver opening by a pin inserted through the two tubular portions thereof and locked or clipped to prevent removal of the drawbar from the receiver hitch. The two components are both toleranced to ensure that the drawbar can be freely inserted and removed from the receiver opening.

The shank of the drawbar may include an aperture and the receiver hitch may include a correspondingly shaped and aligned aperture through which the pin or lock may be inserted to operatively engage the drawbar with the receiver hitch. The lock may be used to generally prevent an unauthorized user from removing the drawbar from the receiver hitch.

However, apertures of different drawbars and receiver hitches may not be consistently the same—especially for receiver hitches of different classes. For example, the apertures of the drawbar and receiver hitch may be ½ of an inch or ⅝ of an inch in diameter. This may require that a user have either a separate lock pin for both ½ of an inch and ⅝ of an inch apertures or utilize a lock pin having a ⅝ of an inch sleeve that slides over the ½ of an inch pin lock to operatively engage the applicable apertures.

Unfortunately, however, this sleeve often gets lost or misplaced when not in use. Further, a user may inadvertently use the ½ of an inch pin in a ⅝ of an inch aperture, which would fit but would not operatively fit resulting in less than preferred operational condition.

A need is therefore identified for an improved receiver pin lock that accommodates apertures of the drawbar and receiver hitch of a plurality of sizes that is easy to utilize and does not require additional components that may otherwise become misplaced.

SUMMARY

A receiver pin lock for insertion into first and second sized opposed engaging apertures of first and second hitch receivers is shown and described. The receiver pin lock may include a stem, a first stepped portion extend from the stem, and a lock member selectively engageable with the stem, the lock member preventing removal of stem from either of the first and second hitch receivers. The receiver pin lock may also include a second stepped portion positioned on the lock member and extending from the stem, where the stem is configured to operatively engage the first sized engaging apertures of the first hitch receiver and the first and second stepped portions are configured to operatively engage the second sized engaging apertures of the second hitch receiver.

A receiver pin lock for insertion into first and second sized opposed engaging apertures of first and second hitch receivers may include a stem having a stem diameter. The receiver pin lock may also include first and second stepped portions extending from the stem, the first and second stepped portions having stepped diameters, where the stem is configured to operatively engage the first sized engaging apertures of the first hitch receiver whereby the stem diameter is substantially similar size of the first sized engaging aperture and where the first and second stepped portions are configured to operatively engage the second sized engaging apertures of the second hitch receiver whereby the stepped diameters are substantially similar size of the second sized engaging aperture.

A receiver pin lock may include a shank having a first diameter and extending a first length. The receiver pin lock may also include first and second stepped portions extending from the shank, the first and second stepped portions having second and third diameters, respectively, the first and second stepped portions extending a second length, the first diameter less than the second and third diameters where the shank is insertable into a first hitch receiver having a pair of apertures spaced apart an aperture length on opposed sides, whereby the first diameter is substantially equivalent a diameter of the pair of apertures and the aperture length is substantially equivalent the first length, and where the first and second stepped portions are insertable into a second hitch receiver having a pair of apertures spaced apart a second aperture length on opposed sides, whereby the second and third diameter are substantially equivalent a diameter of the pair of apertures of the second hitch receiver and the second aperture length is substantially equivalent the second length.

DESCRIPTION OF THE DRAWINGS

Operation of the present teachings may be better understood by reference to the detailed description taken in connection with the following illustrations, wherein.

DETAILED DESCRIPTION

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings.

Figure 1:
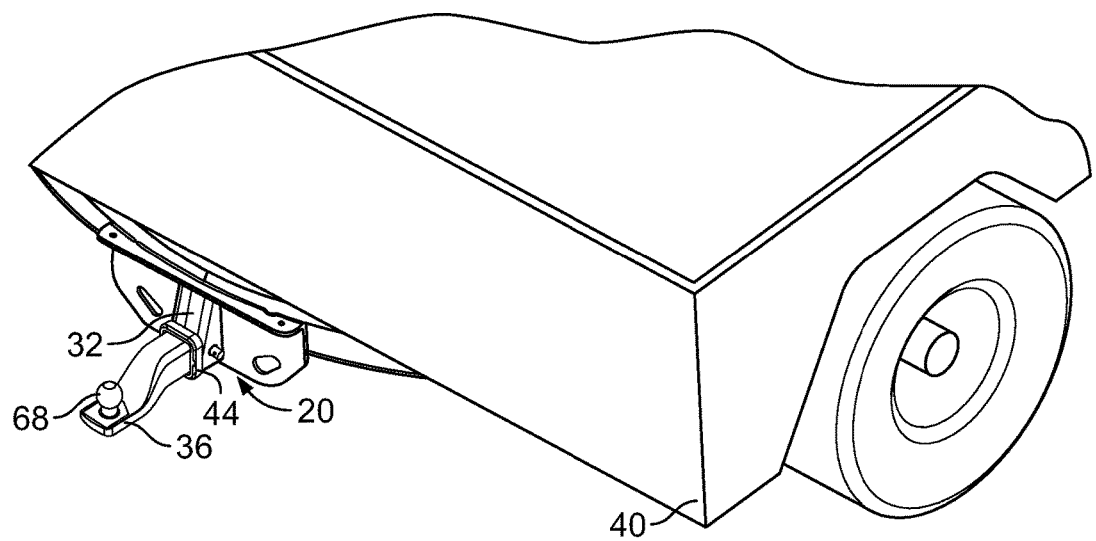
FIG. 1 is a perspective view of a vehicle having an adjustable pin lock operatively securing a drawbar with a receiver hitch.

FIGS. 1-6 show an exemplary embodiment of a receiver pin lock 20. As shown in FIG. 1, the receiver pin lock 20 may be operatively engaged with generally aligned engaging apertures 24, 28 of a receiver hitch 32 and drawbar 36. The receiver hitch 32 may be operatively attached with a vehicle 40 in any appropriate manner. The present teachings are not limited to the receiver hitch 32 shown and described herein—any current or newly developed receiver hitch may be utilized without departing from the present teachings. By way of a non-limiting example, the receiver hitch 32 may be attached to a frame (not shown) of the vehicle 40, such as through use of fasteners, welding or the like. As illustrated the receiver hitch 32 may include a receiver tube 44 adapted to selectively accept a drawbar of a corresponding shape and size as described in more detail below.

The receiver tube 44 may be mounted to the receiver hitch 32 by any appropriate mounting techniques, such as by way of non-limiting examples, fastening or welding. In some embodiments, the receiver tube 44 may include a generally square receiver opening 48 of approximately 1¼ inches (32 mm) for Class I/II or 2 inches (51 mm) for Class III/IV/V receiver hitches. It is to be expressly understood that other sizes or shapes of the receiver tube 44 and receiver opening 48 may be used without departing from the present teachings.

The receiver tube 44 may include an interior portion 52 and an exterior portion 56—the interior portion 52 may terminate at the receiver opening 48. The receiver tube 44 may also include at least two engaging apertures 24 disposed from one another. By way of a non-limiting example, the engaging apertures 24 may be generally aligned—such as axially aligned—on opposing sides 60 of the receiver tube 44. The engaging apertures 24 may extend entirely through the sides 60 and may be configured to receive the receiver pin lock 20 as described in more detail below.

The drawbar 36 may be of any appropriate configuration and may be selectively engaged with the receiver hitch 32—see FIG. 1. By way of a non-limiting example, the drawbar 36 may include an exterior portion 64 having a generally corresponding shape to that of the interior portion 52 of the receiver tube 44. The drawbar 36 may also have an external size or shape slightly less than the internal size or shape of the receiver tube 44. This may enable the drawbar 36 to be inserted within the receiver tube 44 in a telescoping manner, as shown in FIG. 1.

In some embodiments, the drawbar 36 may include a trailer hitch ball 68 mounted thereto in any appropriate manner; including, by way of a non-limiting example, via fasteners or welding. Further, the trailer hitch ball 68 may be monolithically formed with the drawbar 36. It should be understood that the term drawbar is used throughout to describe the portion that is insertable into the receiver tube 44 and is not limited to a ball mount as shown. The drawbar 36 may be attached to any appropriately configured ball mount, cargo accessory, such as bicycle carriers, ski carriers, cargo compartments, platforms, baskets, storage boxes, lights, steps, accessory members, cargo trays, pintle mounts and other types of receiver hitch-mounted devices.

Regardless of the accessory or ball mount utilized with the drawbar 36, the drawbar 36 may be inserted into the interior portion 52 of the receiver hitch 32. The receiver pin lock 20 may be utilized for insertion into the engaging apertures 24, 28 of the receiver hitch 32 and the drawbar 36. The receiver pin lock 20 may operatively secure the drawbar 36 with the receiver hitch 32 such that the drawbar 36 is generally prevented from being removed from the receiver hitch 32 by an unauthorized person. However, it should be understood that the present teachings are not limited to this configuration—any appropriate configuration between the drawbar 36 and receiver hitch 32 may be utilized with the receiver pin lock 20.

The receiver pin lock 20 may include a stop portion 72, a first stepped portion 76 extending from the stop portion 72, and a shank 80 extending from the stepped portion 76. The stop portion 72, first stepped portion 76 and shank 80 may be monolithically formed with each other or may be attached through subsequent operation, e.g., adhering, welding, fastening or the like. The stop portion 72 may be configured to not pass through either of or both of the engaging apertures 24, 28 of the receiver hitch 32 and drawbar 36, respectively. By way of a non-limiting example, the stop portion 72 may be a generally cylindrical shape having a diameter $D_1$. The diameter $D_1$ may be of any appropriate size that prevents such from passing through either of or both of the engaging apertures 24, 28. For example $D_1$ may be larger than ⅝ of an inch, e.g., it may be approximately 1 inch. It should be understood, however, that the stop portion 72 may be of any appropriate shape and size and is not limited to that shown and described.

Figure 5:
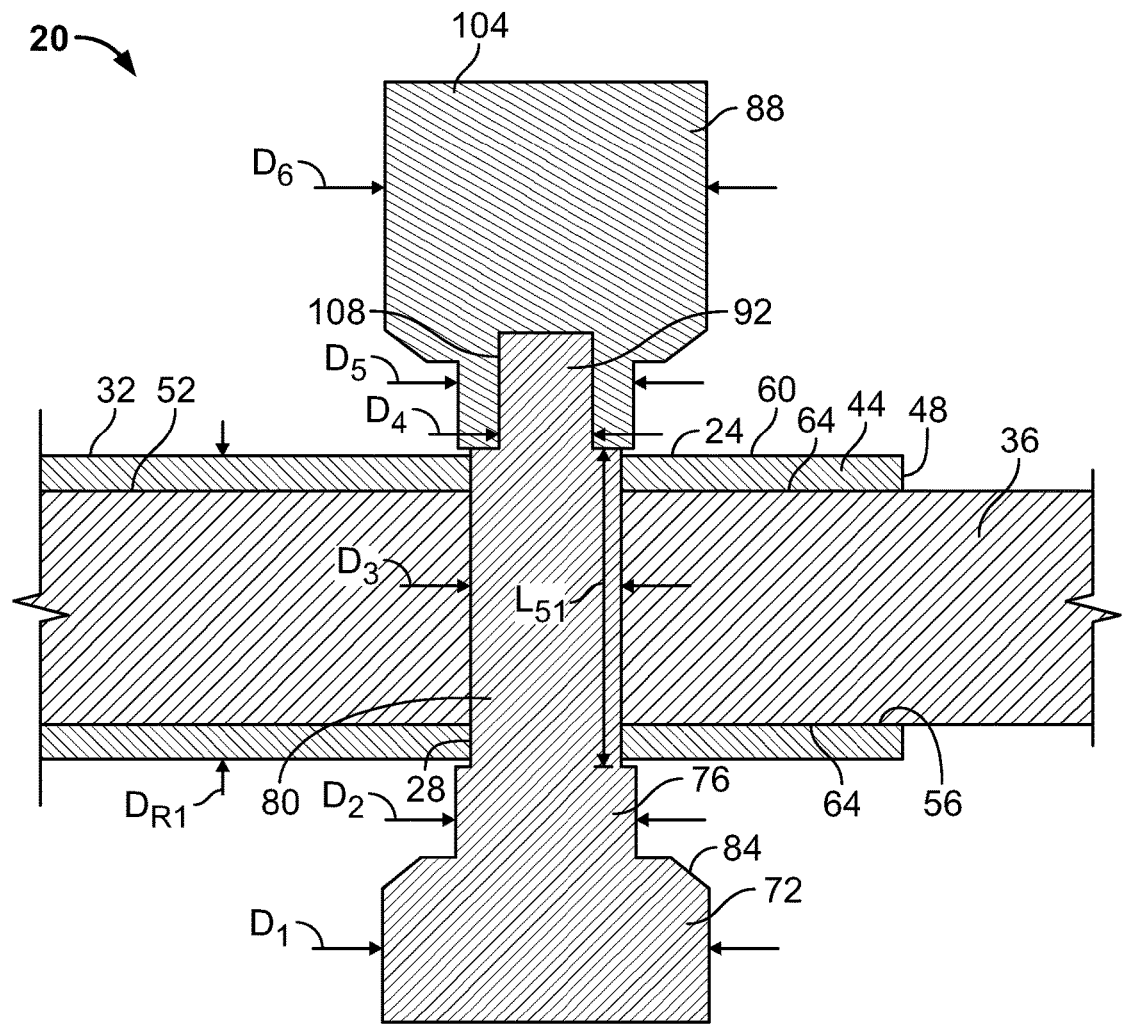
FIG. 5 is a cross-sectional view of the adjustable pin lock operatively securing the drawbar with the receiver hitch.

The stepped portion 76 may be of any appropriate shape and size. By way of a non-limiting example, the stepped portion 76 may extend from the stop portion 72 and be of a smaller diameter $D_2$ than the stop portion 72 diameter $D_1$, such as being 37.5% less in diameter than the stop portion 72. As shown in FIG. 5, the stepped portion 76 may have a generally circular cross-sectional shape with the diameter $D_2$ being approximately ⅝ of an inch.

Further, a transition portion 84 may be positioned between the stop portion 72 and stepped portion 76. The transition portion 84 may be a continuous or discontinuous transition between the stop portion 72 and stepped portion 76, e.g., the transition portion 84 may act as a ramp between the stop portion 72 and stepped portion 76. The transition portion 84 may be of any appropriate configuration and is not limited to that shown. Further still, in some embodiments the receiver pin lock 20 may not include the transition portion 84 and the stop portion 72 may transition directly into the stepped portion 76. As shown, the transition portion 84 may be smaller than the stop portion 72, but larger than the stepped portion 76.

The shank 80 may extend from the stepped portion 76 and be integrally formed therewith. In some embodiments, the shank 80 may be monolithically formed with the stepped portion 76, transition portion 84 and stop portion 72. In some embodiments, the shank 80 may be attached with the stepped portion 76 in any appropriate manner, including, without limitation by adhering, welding or fastening. In yet some embodiments, the shank 80 may be monolithically formed with the stepped portion 76 and transition portion 84 or just the stepped portion 76. The shank 80 may have a generally circular cross-sectional shape and be of a diameter $D_3$ generally less than the diameter $D_2$ of the stepped portion 76. For example, the shank 80 may have a diameter $D_3$ of about ½ of an inch and this diameter $D_3$ may generally extend the entire length of the shank 80, but may also extend a substantial portion of the length of the shank 80, including, without limitation a majority portion of the length of the shank 80. Further, end portions 82 of the shank 80 may have a diameter $D_3$ of approximately ½ of an inch whereby a remaining central portion 83 thereof may have a diameter that is less than that of the end portions, e.g. 7/16 of an inch.

Figure 6:
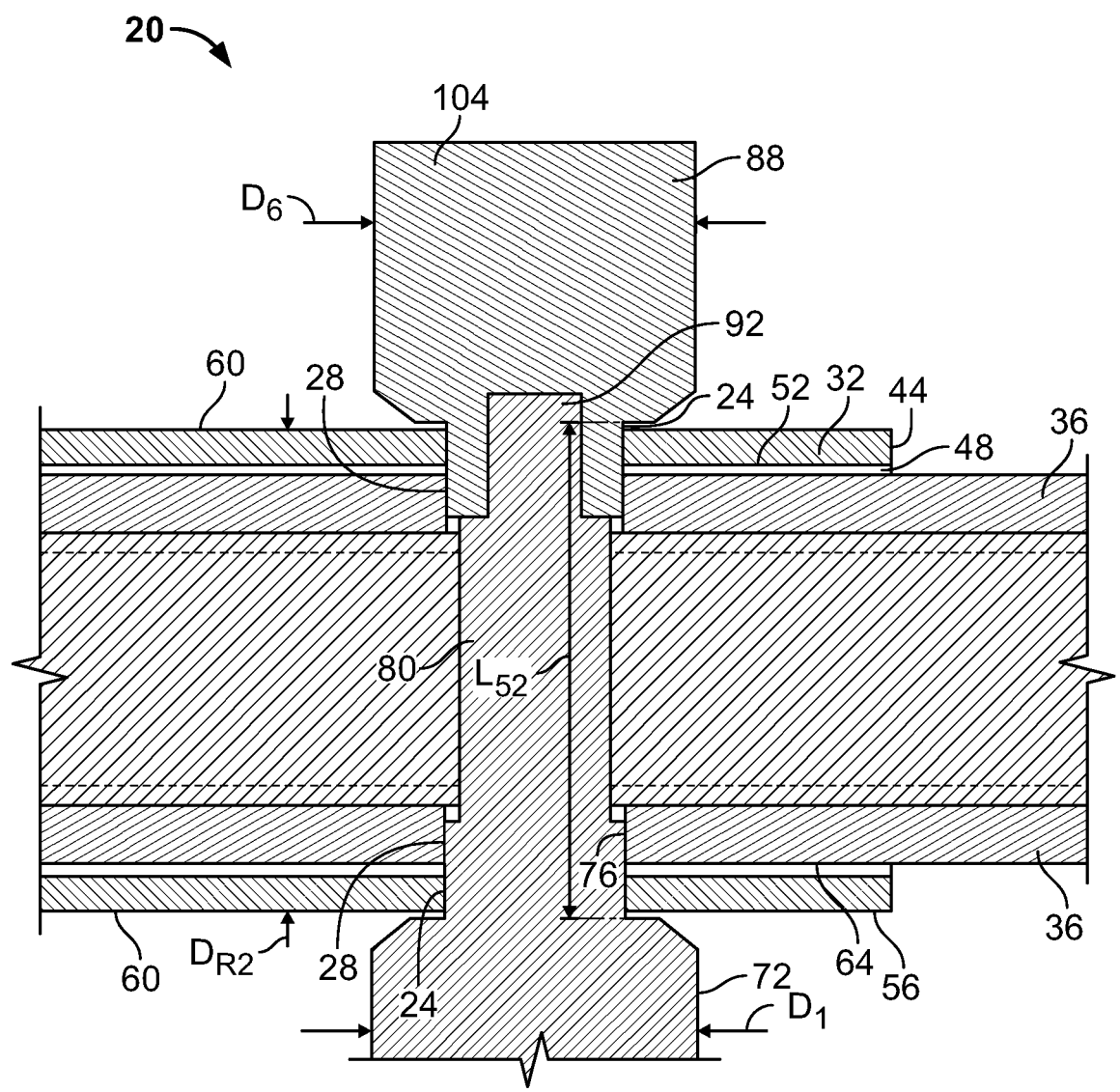
FIG. 6 is a cross-sectional view of the adjustable pin locked operatively securing a drawbar with a receiver hitch.

The receiver pin lock 20 may further include a lock member 88 that selectively attaches with the shank 80 in any appropriate manner. In such embodiments, the shank 80 may include an engaging end portion 92 that extends from the shank 80. The engaging end portion 92 may constitute any appropriate configuration. As shown in FIGS. 5 and 6 as an exemplary embodiment, the engaging end portion 92 may have a diameter $D_4$ that is less than the diameter $D_3$ of the remainder of the shank 80, e.g., it may be ⅜ of an inch. However, the present teachings are not limited to this configuration. For example, the engaging end portion 92 may be of generally an equivalent diameter of the remainder of the shank 80 $D_3$. Further still, the engaging end portion 92 may have a generally larger diameter than the remainder of the shank 80 $D_3$. The engaging end portion 92 may be configured to selectively engage with the lock member 88 in any appropriate manner.

Figure 2:
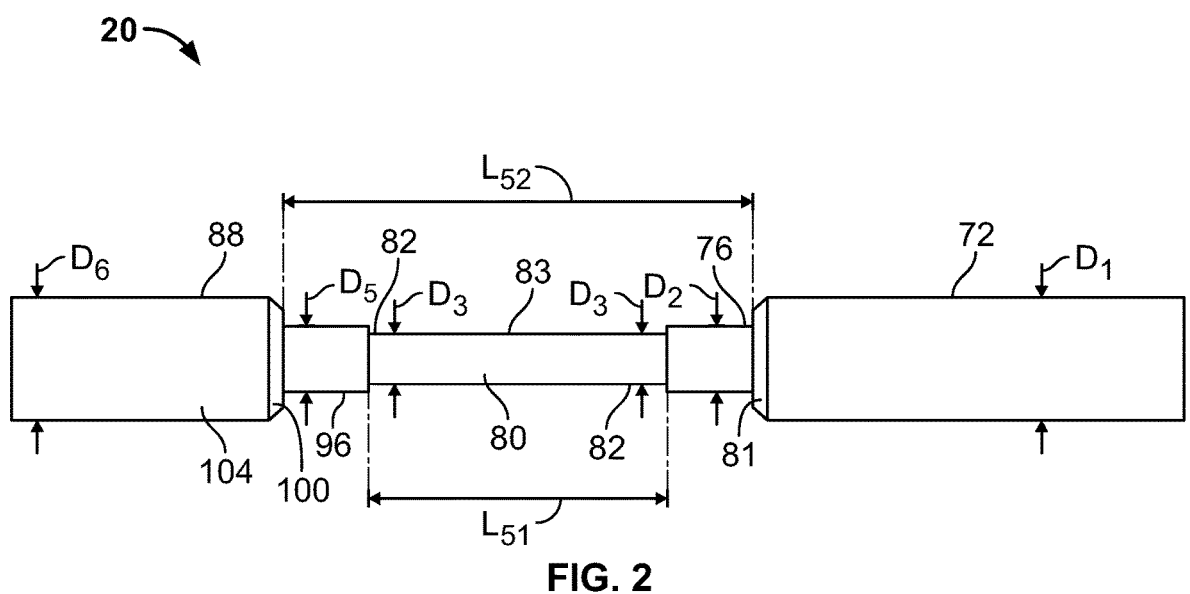
FIG. 2 is a side view of an adjustable pin lock.

The lock member 88 may include a stepped portion 96, a transition portion 100 extending from the stepped portion 96 and a lock body 104 extending from the transition portion 100. The stepped portion 96 may be of any appropriate shape and size. By way of a non-limiting example, the stepped portion 96 may be of a smaller diameter than lock body 104. As shown in FIG. 2, the stepped portion 96 may have a generally circular cross-sectional shape with a diameter $D_5$ of approximately ⅝ of an inch. Further, the transition portion 100 may be positioned between the stepped portion 96 and the lock body 104. The transition portion 100 may be a continuous or discontinuous transition between stepped portion 96 and the lock body 104. The transition portion 100 may be of any appropriate configuration and is not limited to that shown.

The lock body 104 may be of any appropriate configuration and is not limited to that shown and described herein. The lock body 104 may have a diameter $D_6$ that is greater than ⅝ of an inch, such as being approximately 1 inch. The lock body 104 may include an opening 108 configured to receive the engaging end portion 92 of the shank 80. As shown, the engaging end portion 92 is of a configuration such that it may be selectively engaged with the opening 108.

It should be understood that while the engaging end portion 92 is shown as being inserted into the lock body 104 the present teachings are not limited to this configuration. In other embodiments, the lock body 104 may be inserted into the engaging end portion 92—opposite of what is shown in the drawings. Any appropriate configuration of selective engagement of the engaging end portion 92 of the shank and lock body 104 may be utilized without departing from the present teachings.

Figure 3:
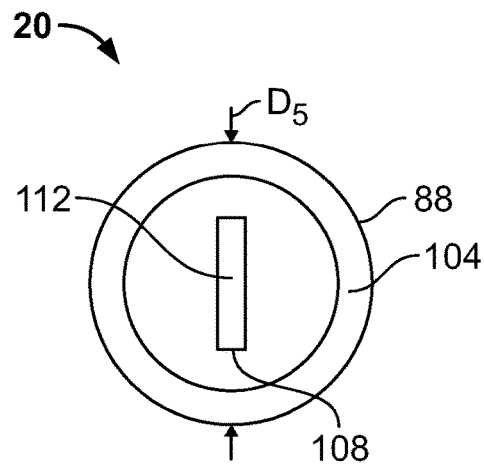
FIG. 3 is a front view of the adjustable pin lock.
Figure 4:
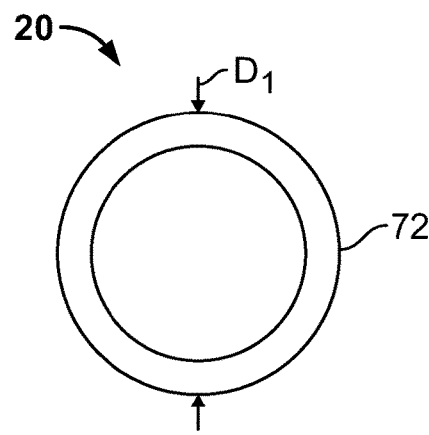
FIG. 4 is a rear view of the adjustable pin lock.

The lock member 88 may include a lock 108 positioned in the lock body 104—a portion of which is shown in FIG. 3. The lock 108 may selectively engage and lock the lock body 104 with the engaging end portion 92 of the shank 80. The lock 108 may be of any known or future developed configuration, such as that shown and described in U.S. Pat. No. 6,543,260, incorporated herein by reference in its entirety. The lock 108 may include an opening 112 configured for insertion of a key to operate the lock 108. The key may be inserted into the opening 112 and rotated so as to lock and unlock the lock 108. In some embodiments, the lock 108 being locked may operatively secure the lock body 104 with the engaging end portion 92 of the shank 80. Unlocking the lock 108 may release the engaging end portion 92 from the shank 80. While a keyed lock 108 is shown and described, the present teachings are not limited to this configuration. The lock 108 may be a combination lock, round key lock, pad lock, or any other lock configuration.

The receiver pin lock 20 may be configured to be reversible, i.e., it does not matter which side the lock body 104 is positioned to operatively secure the receiver pin lock 20 with the receiver hitch 32 and drawbar 36. By way of a non-limiting example, the diameter $D_6$ of the lock body 104 may be generally equivalent to the diameter $D_1$ of the stop portion 72. Further, the diameter $D_2$ of the stepped portion 76 may be generally equivalent to the diameter $D_4$ of the stepped portion 96. Further still, the diameter $D_3$ of the shank 80 may be generally consistent the length of the shank 80. The present teachings, however, are not limited to this configuration. For example, the diameter $D_6$ of the lock body 104 may be different from that the diameter $D_1$ of the stop portion 72.

In operation, the receiver pin lock 20 may be configured to be operatively inserted into and locked in a plurality of different sized drawbars and receiver hitches. By way of a non-limiting example, the receiver pin lock 20 may be configured to be operatively inserted into and locked in at least both of a 1¼ and 2 inch receiver hitches. In many embodiments of the 1¼ inch receiver hitch 32 the engaging apertures 24 may be approximately ½ of an inch in diameter. In such embodiments, the distance $D_{R1}$ between the engaging apertures 24 of the receiver hitch 32 may be such that the shank 80 of the receiver pin lock 20 extends between the engaging apertures 24—see FIG. 5. The shank 80 may extend for a length $L_{S1}$ whereby $L_{S1}$ may be generally equivalent or slightly greater than the distance $D_{R1}$. This results in the shank 80 extending between the engaging apertures 24 or slightly beyond both of the engaging apertures 24. In such embodiments, the diameter $D_3$ of the shank 80 may be ½ of an inch and may operatively engage with the ½ of an inch diameter engaging apertures 24 of the receiver hitch 32. The engaging apertures 28 of the drawbar 36 may be of a generally corresponding size to that of the engaging apertures 24. In such embodiments, the stepped portions 76 and 96 extend from the shank 80 exterior to the drawbar 36 and receiver hitch 32. The stepped portions 76 and 96 may each engage with a side of the receiver hitch 32 to further provide a tight operative fit for the receiver pin lock 20.

Further, the receiver pin lock 20 may also be utilized to be operatively inserted into and locked in a 2 inch receiver hitch 32 and drawbar 36. In many embodiments of the 2 inch receiver hitch 32 may include engaging apertures 24 of approximately ⅝ of an inch in diameter. In such embodiments, the distance $D_{R2}$ between the engaging apertures 24 of the receiver hitch 32 may be such that the stepped portions 76 and 96 of the receiver pin lock 20 extends between the engaging apertures 24—see FIG. 6. The stepped portions 76 and 96 may extend apart from one another for a length $L_{S2}$ whereby $L_{S2}$ may be generally equivalent or slightly greater than the distance $D_{R2}$. This results in the stepped portions 76 and 96 extending into the engaging apertures 24 or slightly beyond both of the engaging apertures 24. In such embodiments, the distance $D_{R2}$ from the engaging apertures 28 of the drawbar 36 may be such that when inserted the stepped portions 76 and 96 of the receiver pin lock 20 operatively engage the engaging apertures 24 and 28 of the receiver hitch 32 and drawbar 36, respectively.

The stepped portions 76 and 96 may have a ⅝ of an inch diameter that may operatively engage with the ⅝ of an inch diameter of the engaging apertures 24 and 28. This may permit a single receiver pin lock 20 to be operatively utilized with drawbars and receiver hitches of at least 1¼ and 2 inches having engaging apertures 24, 28 of approximately ½ of an inch and ⅝ of an inch, respectively. In such embodiments, the stop portion 72 and the lock body 104 may engage sides of the receiver hitch 32 to provide a tight fit.

During operation, the user may remove the lock member 88 from the shank 80. The user may insert the shank 88 into and through the engaging apertures 24 and 28 of the receiver hitch 32 and drawbar 36 until the engaging end portion 92 of the shank 80 extends from a side of the receiver hitch 32 and drawbar 36 opposite to a side in which the shank 88 is inserted. The lock member 88 may be operatively and lockingly engaged with the engaging end portion 92. The user may lock the lock member 88, which may generally prevent the receiver pin lock 20 from being removed, which may lockingly secure the receiver hitch 32 with the drawbar 36.

The receiver pin lock 20 may be of such a configuration that the appropriate portion of the receiver pin lock 20 may engage the engaging apertures 24 and 28 of the receiver hitch 32 and drawbar 36 of the applicable size. For example and as shown in FIG. 5, the portion of the shank 80 having the diameter $D_3$ of approximately ½ of an inch may operatively engage the engaging apertures 24 and 28 for those 1¼ inch hitch receivers 32 and corresponding drawbar 36. In the 1¼ inch hitch receivers 32 and its corresponding drawbar 36 the respective engaging apertures 24, 28 may be approximately ½ of an inch in diameter. The diameter $D_3$ of the shank 80 may be ½ inches, which may provide a tight fit with the engaging apertures 24, 28.

Further as shown in FIG. 6, the diameters $D_2$ and $D_5$ of the stepped portions 76 and 96 may be approximately ⅝ of an inch and may operatively engage the engaging apertures 24 and 28 for those 2 inch hitch receivers 32 and corresponding drawbar 36. In the 2 inch hitch receivers 32 and its corresponding drawbar 36 the respective engaging apertures 24, 28 may be approximately ⅝ of an inch in diameter. As the diameters $D_2$ and $D_5$ of the stepped portions 76 and 96 may be ⅝ inches, which may provide a tight fit with the engaging apertures 24, 28. This tight fit may eliminate the necessity for additional components, such as sleeves and may reduce the uncertainty of which size receiver lock should be used. The receiver pin lock 20 may "automatically" fit with the appropriately sized engaging apertures 24, 28 and corresponding receiver hitch 32 and drawbar 36, respectively.

In order to remove the receiver pin lock 20, the user may insert a key into the opening 112 of the lock 108. The user may rotate or pivot the key and the lock 108 may become disengaged from the engaging end portion 92, which may allow the user to pull the lock member 104 from the engaging end portion 92. The user may then grasp the stop portion 72 and the shank 80 and/or stepped portions 76 and 96 may be removed from the receiver hitch 32 and drawbar 36. The drawbar 36 may then be removed from the receiver hitch 32.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. A receiver pin lock for insertion into first and second sized opposed engaging apertures of first and second hitch receivers, the receiver pin lock comprising:
   a stem;
   a lock member attached with the stem, the lock member preventing removal of the stem from either of the first and second hitch receivers; and
   first and second stepped portions extending from opposite ends of the stem, wherein the stem operatively engages the first sized engaging apertures of the first hitch receiver and the first and second stepped portions operatively and directly engage the second sized engaging apertures of the second hitch receiver.

2. The receiver pin lock of claim 1, wherein the stem extends a stem distance whereby the stem distance is substantially equivalent a distance between the first opposed engaging apertures of the first hitch receiver.

3. The receiver pin lock of claim 1, further comprising a stop portion, wherein the stop portion has a larger diameter than the first and second stepped portions.

4. The receiver pin lock of claim 3, wherein the lock member and stop portion prevent withdrawal of the stem from either of the first and second hitch receiver.

5. A receiver pin lock for insertion into first and second sized opposed engaging apertures of first and second hitch receivers, the receiver pin lock comprising:
   a stem having a stem diameter;
   first and second stepped portions extending from opposite ends of the stem, the first and second stepped portions having stepped diameters; and
   wherein the stem operatively engages the first sized engaging apertures of the first hitch receiver and the stem includes a stem length whereby the stem length is substantially equivalent a first distance between the first opposed engaging apertures;
   wherein the first and second stepped portions operatively and directly engage the second sized engaging apertures of the second hitch receiver whereby the stepped diameters are larger than the stem diameter and the stem and first and second stepped portions extend a stepped distance whereby the stepped distance is substantially equivalent a second distance between the second opposed engaging apertures.

6. The receiver pin lock of claim 5, wherein the second distance is greater than the first distance.

7. A receiver pin lock comprising:
   a shank having a first diameter and extending a first length;
   first and second stepped portions extending from opposite ends of the shank, the first and second stepped portions having diameters larger than the first diameter, the first and second stepped portions extending a second length;
   wherein the shank is insertable into a first hitch receiver having a pair of apertures spaced apart an aperture length on opposed sides, whereby the aperture length is substantially equivalent the first length; and
   wherein the first and second stepped portions are insertable into a second hitch receiver having a pair of apertures spaced apart a second aperture length on opposed sides, whereby the second aperture length is substantially equivalent the second length.

8. The receiver pin lock of claim 7, further comprising a lock member selectively attached to the shank, a portion of the lock member preventing withdrawal of the shank from either of the first and second hitch receivers.

9. The receiver pin lock of claim 8, wherein the second stepped portion is included on the lock member.

10. The receiver pin lock of claim 8, further comprising a stop portion attached with the first stepped portion, the stop portion generally preventing withdrawal of the stem from either of the first and second hitch receivers.

11. The receiver pin lock of claim 10, wherein the first and second stepped portions diameters are about ⅝ of an inch.

12. The receiver pin lock of claim 7, wherein the first diameter is about ½ of an inch.

\* \* \* \* \*